United States Patent [19]

Elliot

[11] E Patent Number: Re. 33,312

[45] Reissued Date of Patent: Aug. 28, 1990

[54] VIBRATORY ROLLER WITH AXIALLY SPACED ZIG ZAG IMPACT BARS AND WIRE ROPE CLEANERS

[76] Inventor: Robert B. Elliot, Pond Reef Rd., Ketchikan, Ak. 99928

[21] Appl. No.: 63,090

[22] Filed: Jun. 17, 1987

Related U.S. Patent Documents

Reissue of:

[64] Patent No.: 4,523,873
Issued: Jun. 18, 1985
Appl. No.: 524,154
Filed: Aug. 16, 1983

[51] Int. Cl.[5] ..... E01C 19/28; E01C 19/26

[52] U.S. Cl. ..... 404/124; 404/129; 299/40; 172/554; 172/606

[58] Field of Search ..... 404/103, 117, 121, 123, 404/128, 129; 172/40, 122, 540, 554, 606, 610; 301/41, 43; 299/36, 39, 95, 40; 241/101.7

[56] References Cited

U.S. PATENT DOCUMENTS

| | | | |
|---|---|---|---|
| 15,049 | 6/1856 | Yost | 301/43 |
| 739,307 | 9/1903 | Grubb | 404/124 X |
| 958,346 | 5/1910 | Williamson et al. | 404/124 X |
| 1,952,545 | 3/1934 | Gotshall | 305/39 |
| 2,261,893 | 11/1941 | Wolfard | 404/124 |
| 2,582,199 | 1/1952 | Gardner et al. | 404/124 |
| 2,728,277 | 12/1955 | McRae | 404/117 |
| 3,071,050 | 1/1963 | Shatto | 404/124 |
| 3,276,337 | 10/1966 | Gardner | 404/124 |
| 3,633,471 | 1/1972 | Randour | 404/121 |
| 3,823,983 | 7/1974 | Peterson | 404/122 X |
| 4,227,827 | 10/1980 | Arenz | 404/121 |
| 4,370,895 | 2/1984 | Wright | 301/43 X |
| 4,425,051 | 1/1984 | Gallaway | 404/117 X |

FOREIGN PATENT DOCUMENTS

| | | | |
|---|---|---|---|
| 638497 | 4/1962 | Italy | 404/121 |

*Primary Examiner*—Jerome W. Massie
*Assistant Examiner*—Matthew Smith
*Attorney, Agent, or Firm*—Lyon & Lyon

[57] ABSTRACT

A vibratory roller is journalled from a frame portion of a vehicle of the compaction-type an the roller includes a generally cylindrical outer face. A plurality of circumferentially extending lug bands are carried by the roller outer surface and are disposed in laterally spaced zones of the outer face spaced longitudinally of the roller and in which diametric planes of the roller lie. The lug bands are comprised of lugs including outer surfaces disposed at least substantially normal to intersecting radii of the roller and generated about the axis of rotation of the roller. The outer surfaces are at least substantially circumferentially continuous about the roller and extend in zig zag paths contained in the aforementioned zones. The lateral spacing between adjacent zones defines circumferentially continuous paths of the outer roller face which are free of the lug bands and scraper members are carried by the frame portion and disposed in at least closely spaced relation to the face of scraping accumulated debris from the aforementioned paths. The lugs are generally hexagonal in transverse cross section and are welded to the outer face of the roller with the welding operation being performed to create fillets on opposite sides of the lugs forming downward and outward inclined continuations of the inclined side surfaces of the lugs intersecting the outer surfaces thereof.

10 Claims, 2 Drawing Sheets

VIBRATORY ROLLER WITH AXIALLY SPACED ZIG ZAG IMPACT BARS AND WIRE ROPE CLEANERS

Matter enclosed in heavy brackets [ ] appears in the original patent but forms no part of this reissue specification; matter printed in italics indicates the additions made by reissue.

BACKGROUND OF THE INVENTION

Various forms of compaction vibratory-type rollers previously have been provided. The outer surfaces of these rollers include various different forms of pro-jections to accomplish different compacting operations. Some forms of vibratory rollers as well as non-vibratory rollers are designed to compact sanitary landfills and other forms of rollers are designed to compact roadbeds and other ground areas. However, most vibratory rollers used to perform compacting operations for roadbeds include smooth outer cylindrical surfaces, inasmuch as various forms of projections such as those provided on a sheepsfoot roller have a tendency to cause "fluffing" or loosening of the surface material and partial destruction of the surface being compacted. Further, other previously known forms of lugs also have undesirable operating characteristics when compacting roadbeds.

Examples of various different forms of compacting rollers as well as other types of rollers including some of the general structural and operational features of the instant invention are disclosed in U.S. Pat. Nos. 2,261,893, 2,509,463, 2,895,390, 3,318,211, 3,463,063 and 4,240,510.

BRIEF DESCRIPTION OF THE INVENTION

The roller of the instant invention is of the vibratory type and includes lug bands extending circumferentially thereabout and spaced axially along the roller. Each of the lug bands comprises lug sections disposed in end abutting relation with adjacent lugs being inclined generally 90° relative to each other and oppositely generally 45° relative to a diametric plane of the roller. Each of the lugs is further hexagonal in transverse cross section wherein the outer surfaces of the lugs are disposed generally normal to radii of the roller and the lugs include opposite side surfaces intersecting with the outer surfaces thereof which are inclined substantially 60° relative to the lug outer surfaces. The lugs are secured to the outer cylindrical face of the drum by welding through the utilization of a welding operation wherein fillets are formed on opposite sides of the lugs forming general continuations of the oppositely inclined opposite side surfaces of the lugs which intersect with the outer surfaces thereof.

The main object of this invention is to provide a vibratory roller of an improved lug-type specifically designed for compacting roadbeds and whereby the outer surfaces of the lugs are of sufficiently small area to break up surface rocks.

Another object of this invention is to provide a lug-type vibratory roller whose lugs are of a configuration that assist in floating the fines of the material being compacted to the top surface thereof.

Yet another object of this invention is to provide a roadbed compacting vibratory roller of the lug-equipped type wherein the lugs are arranged on the roller in circumferential bands laterally spaced apart longitudinally of the roller defining circumferentially continuous paths between adjacent bands along which stationary scraper members may operate during rotation of the roller in order to clean the areas between adjacent lug bands.

Still another important object of this invention is to provide a vibratory roller of the lug-equipped type wherein adjacent sides of the lugs thereof are configured to displace roadbed surface portions therebetween toward the cleaning paths centrally disposed between adjacent bands of lugs.

A final object of this invention to be specifically enumerated herein is to provide a vibratory roller in accordance with the preceding objects and which will conform to conventional forms of manufacture, be of simple construction and automatic in operation so as to provide a device that will be economically feasible, long lasting and relatively trouble free.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
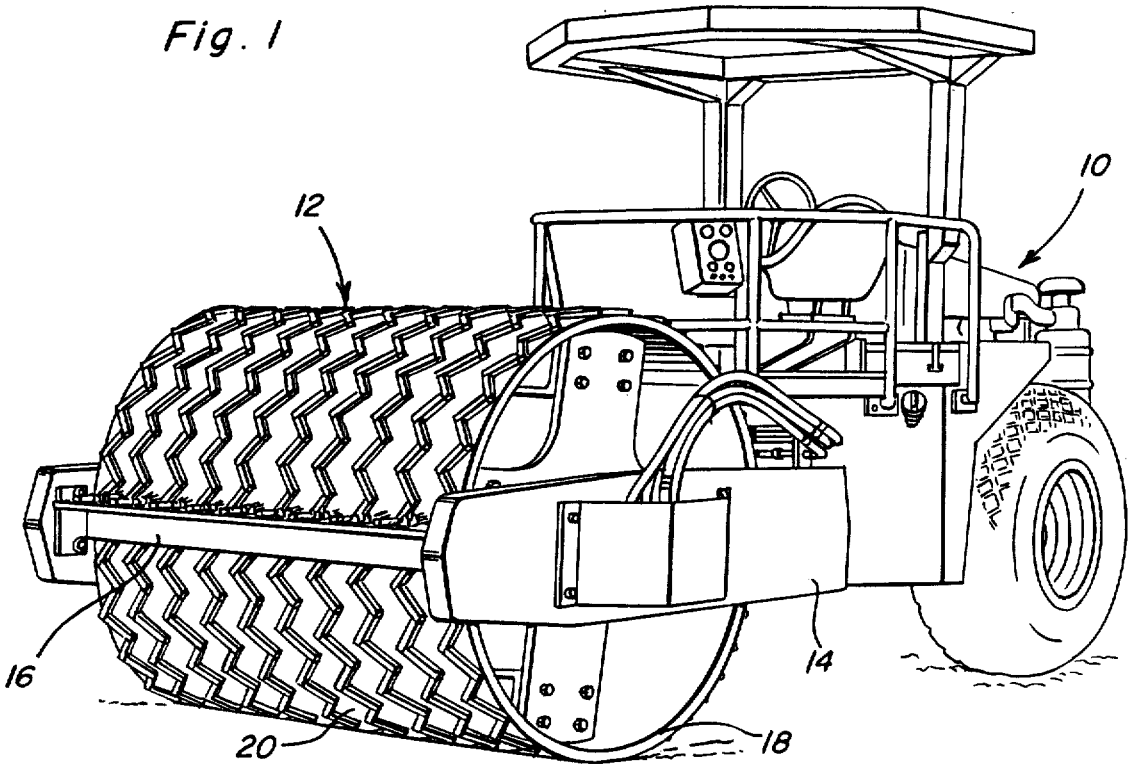
FIG. 1 is a perspective view of a typical form of Ingersoll-Rand compactor equipped with a vibratory roller constructed in accordance with the present invention.
Figure 2:
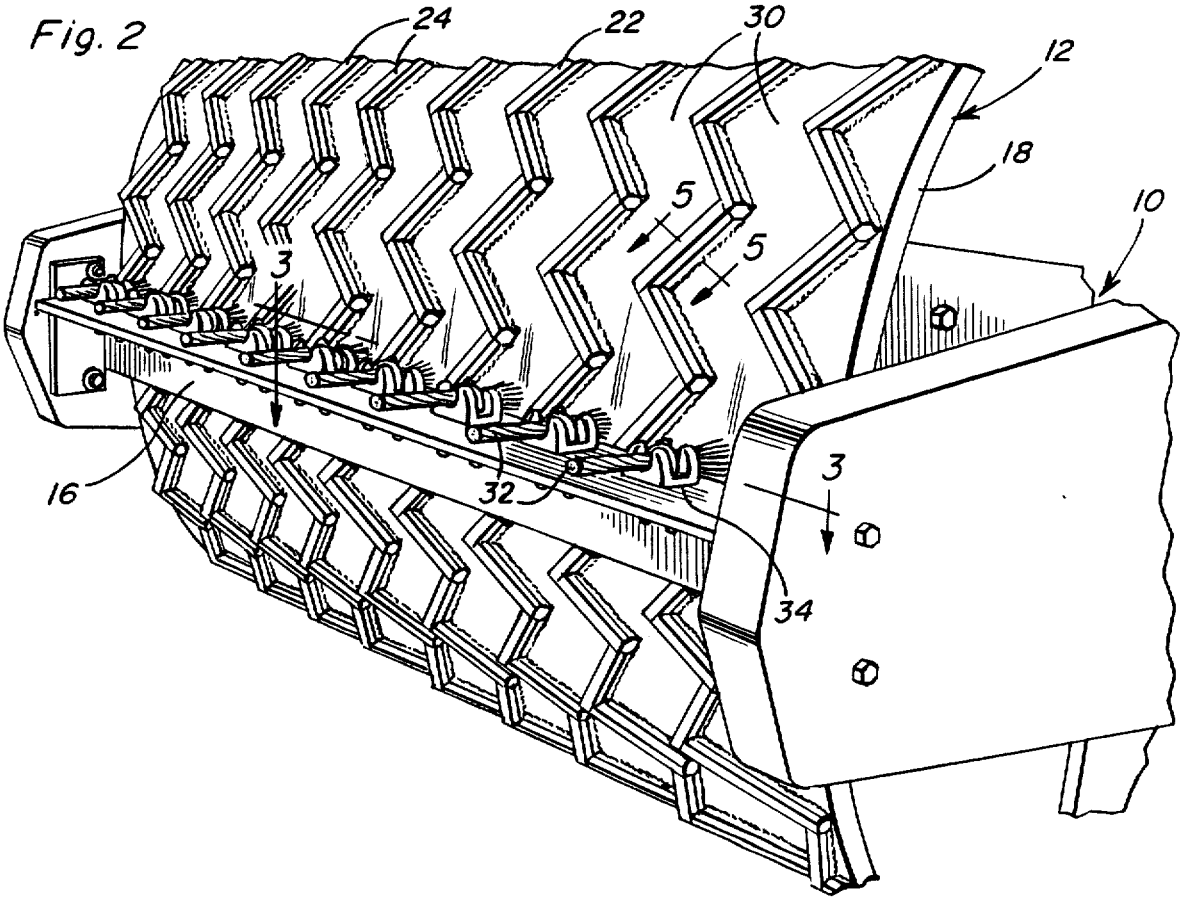
FIG. 2 is a fragmentary perspective view of the roller and an adjacent portion of the compactor from which the roller cleaning scrapers are supported.
Figure 3:
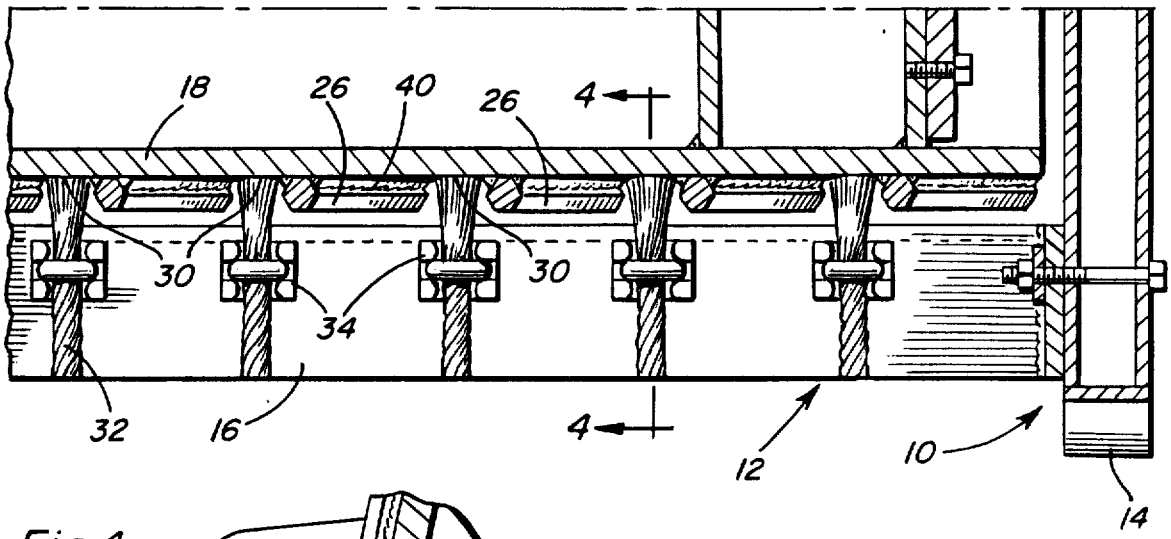
FIG. 3 is an enlarged fragmentary horizontal sectional view taken substantially upon the plane indicated by the section line 3—3 of FIG. 2.
Figure 4:
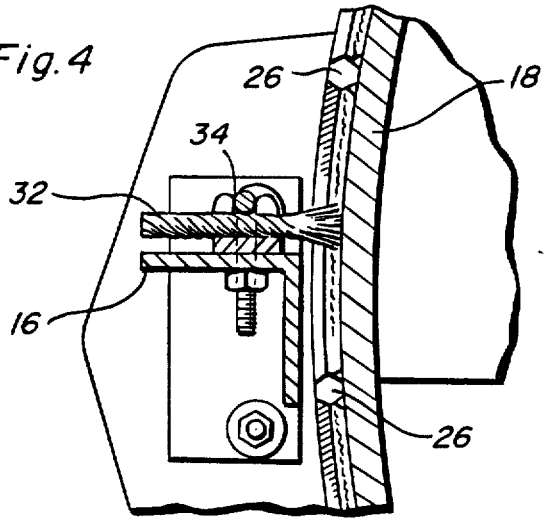
FIG. 4 is a fragmentary vertical sectional view taken substantially upon the plane indicated by the section line 4—4 of FIG. 3.

Referring now more specifically to the drawings the numeral 10 generally designates a conventional form of Ingersoll-Rand compactor equipped with a roller referred to in general by the reference numeral 12 and constructed in accordance with the present invention. The roller 12 is journalled from a frame portion 14 of the compactor and the frame portion 14 includes a transverse bar 16 closely opposing and extending transversely of the outer periphery of the roller. The roller 12 includes a cylindrical body 18 having a cylindrical outer face 20. The roller 12, as described to this point, is conventional in construction. However, the roller 12 includes circumferentially extending lug bands 22 carried by the outer face 20 and the lug bands 22 are disposed in laterally spaced zones 24 of the outer face 20 extending circumferentially thereabout and in which diametric planes of the roller lit. The lug bands 22 are comprised of lugs 26 including outer surface 28 disposed at least substantially normal to intersecting radii of the roller and generated about the axis of rotation of the roller 12. The outer surfaces 28 are at least substantially circumferentially continuous about the roller 12 and extend in zig-zag paths contained in the aforementioned zones 24. The lateral spacing between adjacent zones 24 define circumferentially continuous paths 30 of the outer face 20 which are free of the lugs bands 22. A plurality of elongated scraper members 32 are supported from the bar 16 by suitable clamps 34 and may be adjusted generally radially of the roller 23 to engage corresponding ends of the scraper members 32 with the outer face portions defining the paths 30. The scraper members 32 comprise twisted strand wire rope sections.

Figure 5:
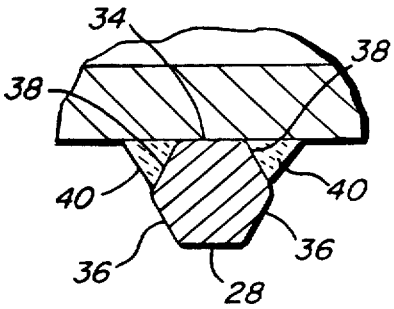
FIG. 5 is a fragmentary enlarged sectional view taken substantially upon the plane indicated by the section line 5—5 of FIG. 2.
Figure 6:
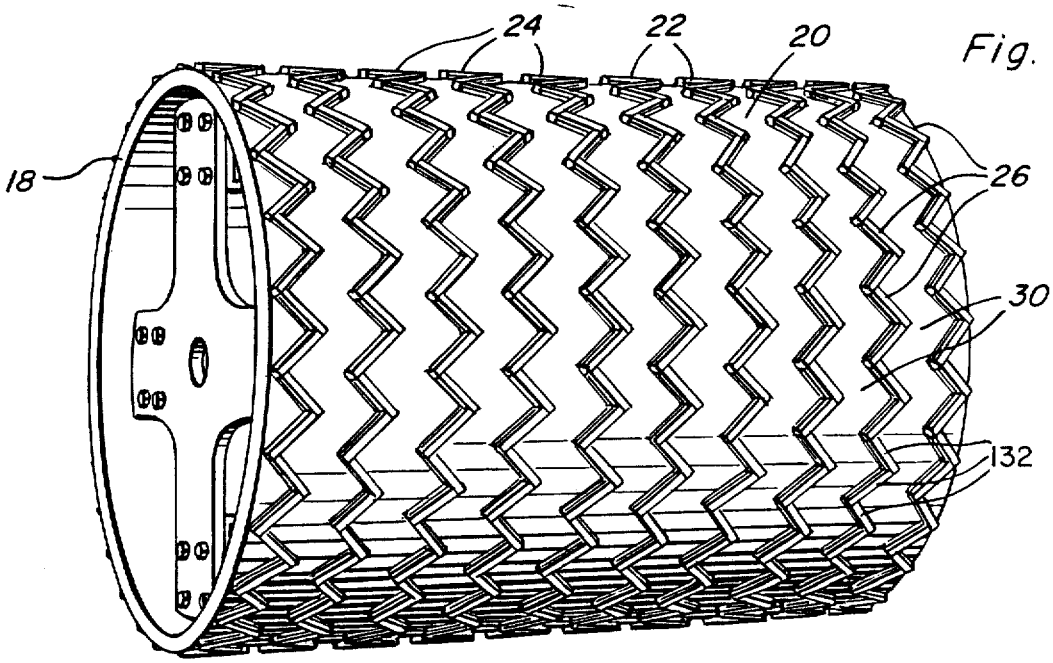
FIG. 6 is a perspective view of the roller.

As may best be seen from FIG. 5 of the drawings the lugs 26 comprise individual lug members *1*32 spaced about the outer face 20 with alternate lug members *1*32 inclined generally 90° relative to each other and oppositely generally 45° relative to the corresponding diametric plane of the roller. The lug members *1*32 are hexagonal in transverse cross section with the inner surfaces 34 thereof opposing and disposed in surface-to-surface contact with the outer face 20. The lug members *1*32 include opposite side surfaces 36 thereof which are oppositely inclined relative to the outer surface 28 and diverge inwardly toward the outer face 20. The inwardly convergent opposite side surfaces 38 of each lug members *1*32 are welded by full welding and the formation of welding fillets 40 to the outer face 20. The welding fillets 40 form general continuations of the oppositely inclined opposite side surfaces 36 of the lug members *1*32 divergent toward the outer face 20.

In operation, the roller 12 may be rolled over a roadbed and the outer surface 28 of the lug members *1*32 will contact and apply sufficient pressure to surface rock to break up the same. As the lug members *1*32 are forced down into the surface of the roadbed being compacted to a predetermined depth defined by the spacing between the outer surface 28 and the outer face 20, the material between adjacent lug bands 22 is displaced toward the paths 30 for scraping therefrom as the roller moves past the scraping members 32. In this manner, a high efficiency compacting operation is carried out and the roller 12 is maintained free of accumulated debris. Further, the compacting operation carried out by the roller 12 functions in a superior manner to float the fines to the top of the roadbed being compacted.

The lug members *1*32 are constructed of high carbon content steel. Because of the small contact area of the outer surfaces 28 with the material being compacted, surface rocks are readily broken into fines and the fines are floated to the top of the surface being compacted. Inasmuch as the welding fillets 40 form continuations of the oppositely inwardly divergent side surfaces 36 of the lug members *1*32, the cleaning action of the scraper members 32 in the paths 30 is rendered more efficient.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a vibratory roller journalled from a frame portion of a vehicle of the compaction-type, said roller including a generally cylindrical outer face, a plurality of circumferentially extending lug bands carried by the outer face of said roller, said lug bands being disposed in laterally spaced zones of said outer face spaced longitudinally of said roller and in which diametric planes of said roller lie, said lug bands being comprised of lugs including outer surfaces disposed at least substantially normal to intersecting radii of said roller and generated about the axis of rotation of said roller, said outer surfaces being at least substantially circumferentially continuous about said roller and extending in zig-zag paths contained in said zones, the lateral spacing between said zones defining circumferentially continuous paths of said outer face free of said lug bands, scraper members carried by said frame portion and disposed in at least closely spaced relation relative to said face, said scraper members being operative to scrape accumulated debris from said paths as said roller is rotated relative to said frame portion, said lugs including opposite side surfaces divergent from said outer surfaces toward said outer face, said lugs being generally hexagonal in transverse cross section and welded to said outer face with the welding operation being performed to create fillets on opposite sides of said lugs forming inward continuations of said inclined side surfaces.

2. The roller of claim 1 wherein said scraper members comprise short twisted multi-strand wire rope members disposed generally radially of said roller.

3. The roller of claim 1 wherein said lugs in each band comprise individual lug members spaced about said face with alternate lug members inclined generally 90° relative to each other and oppositely generally 45° relative to the corresponding diametric plane of said roller.

4. In combination with a vibratory roller journalled from a frame portion of a vehicle of the compaction-type, said roller including a generally cylindrical outer face, a plurality of circumferentially extending lug bands carried by the outer face of said roller, said lug bands being disposed in laterally spaced zones of said outer face spaced longitudinally of said roller and in which diametric planes of said roller lie, said lug bands being comprises of lugs including outer surfaces disposed at least substantially normal to intersecting radii of said roller and generated about the axis of rotation of said roller, said outer surfaces being at least substantially circumferentially continuous about said roller and extending in zig-zag paths contained in said zones, the lateral spacing between said zones defining circumferentially continuous paths of said outer face free of said lug bands, scraper members carried by said frame portion and disposed in at least closely spaced relation relative to said face, said scraper members being operative to scrape accumulated debris from said paths as said roller is rotated relative to said frame portion, said scraper member comprising short twisted multi-strand wire rope members disposed generally radially of said roller, said lugs including opposite side surfaces divergent from said outer surfaces toward said outer face, said side surfaces being inclined generally 60° relative to said outer surfaces, said lugs being hexagonal in transverse cross section and welded to said outer face with the welding operation being performed to create fillets on opposite sides of said lugs forming inward continuations of said inclined side surfaces.

5. The roller of claim 4 wherein said lugs in each band comprise individual lug members spaced about said face with alternate lug members inclined generally 90° relative to each other and oppositely generally 45° relative to the corresponding diametric plane of said roller.

*6. An apparatus suitable for use with a compaction vehicle of the type employed to compact the surface of a road-*

*bed, the compaction vehicle including a frame portion with a journal structure adapted to receive a compaction roller, said apparatus comprising:*

*a roller attachable to the journal structure of the compacting vehicle frame portion, said roller acting to roll over the surface of the roadbed when the compaction vehicle is in operation;*

*means for vibrating said roller;* a cylindrical outer face structure disposed around said roller; and

*a plurality of lug bands positioned on said cylindrical outer face structure to contact the roadbed surface as said roller rolls along the roadbed during operation of the compaction vehicle, each said lug band exhibiting an outer surface disposed over a circumferential zone on said outer face structure and separated from the outer surfaces of adjacent lug bands by distances which, at preselected points along said lug band, are greater than the distance across said outer surface, said outer surfaces of said plurality of lug bands operating simultaneously to contact the roadbed surface over a collective contact area of substantially less dimension than the entire area across aid outer face structure, each said lug band further following along a path which alternates back and forth in substantially continuous fashion around said circumferential zone to promote breakage of rocks and solids and floating of fines in the roadbed in response to the transmission of vibrational forces from the roller through said collective contact area to the roadbed.*

*7. Apparatus as set forth in claim 6, wherein each said lug band is shaped such that said outer surface of said lug band follows a substantially continuous zig-zag pattern about the circumference of said roller.*

*8. Apparatus as set forth in claim 7, wherein each said lug band is comprised of individual lug members circumferentially spaced about said outer face structure with alternate lug members inclined at substantially 90° relative to each other and substantially 45°* relative to the corresponding diametric plane of said roller.

*9. A method for breaking up surface rocks and solids in a roadbed during compacting and for distributing the resulting fines at the top surface of the roadbed, said method comprising the steps of applying vibratory force to a predetermined area of the roadbed surface in continuous fashion along a plurality of path each of which alternates back and forth in substantially continuous fashion within a predetermined zone of said predetermined area, the distance across each of said paths being substantially less than the distance between each of said paths such that the combined surface area of the plurality of alternating paths is less than said predetermined area of the roadbed surface.*

*10. Apparatus for use with a vibrating roller employed to compact the surface of a roadbed, said apparatus comprising:*

*a cylindrical outer face structure disposed around said roller; and,*

*a plurality of lug bands positioned on said cylindrical outer face structure to contact the roadbed surface as said roller rolls along the roadbed during operation of the compaction vehicle, each said lug band exhibiting an outer surface disposed over a circumferential zone on said outer face structure and separated from the outer surfaces of adjacent lug bands by distances which, at preselected points along said lug band, are greater than the distance across said outer surface, said outer surfaces of said plurality of lug bands operating simultaneously to contact the roadbed surface over a collective contact area of substantially less dimension than the entire area across said outer face structure, each said lug band further following along a path which alternates back and forth in substantially continuous fashion around said circumferential zone to promote breakage of rocks and solids and floating of fines in the roadbed in response to the transmission of vibrational forces from the roller through said collective contact area to the roadbed.*

* * * * *